(12) United States Patent
Zhang

(10) Patent No.: US 10,827,873 B2
(45) Date of Patent: Nov. 10, 2020

(54) DOUBLE-LINER ELECTRIC COOKER

(71) Applicant: STENT (GUANGZHOU) INDUSTRIAL CO., LTD., Guangzhou (CN)

(72) Inventor: Mei Zhang, Guangzhou (CN)

(73) Assignee: STENT (GUANGZHOU) INDUSTRIAL CO., LTD., Guangzhou (CN)

( * ) Notice: Subject to any disclaimer, the term of this patent is extended or adjusted under 35 U.S.C. 154(b) by 375 days.

(21) Appl. No.: 15/562,351

(22) PCT Filed: Apr. 30, 2015

(86) PCT No.: PCT/CN2015/078145
§ 371 (c)(1),
(2) Date: Sep. 27, 2017

(87) PCT Pub. No.: WO2016/172984
PCT Pub. Date: Nov. 3, 2016

(65) Prior Publication Data
US 2018/0352992 A1 Dec. 13, 2018

(51) Int. Cl.
*A47J 27/12* (2006.01)
*A47J 36/06* (2006.01)
*A47J 27/00* (2006.01)

(52) U.S. Cl.
CPC .............. *A47J 27/12* (2013.01); *A47J 27/004* (2013.01); *A47J 36/06* (2013.01)

(58) Field of Classification Search
CPC ...... A47J 27/004; A47J 27/12; A47J 31/3666; A47J 31/446; A47J 36/06; A47J 27/08;
(Continued)

(56) References Cited

U.S. PATENT DOCUMENTS

| 8,136,819 B2 * | 3/2012 | Yoshitsune | ............ F16J 15/025 277/630 |
| 2011/0003048 A1 * | 1/2011 | Sugimoto | ............. A47J 27/004 426/509 |

(Continued)

FOREIGN PATENT DOCUMENTS

| CN | 203424780 U | 2/2014 |
| CN | 203619319 U | 6/2014 |

(Continued)

OTHER PUBLICATIONS

English translation of CN 203619319 (Year: 2014).*

*Primary Examiner* — Serkan Akar
*Assistant Examiner* — Chris Q Liu
(74) *Attorney, Agent, or Firm* — Platinum Intellectual Property LLP

(57) ABSTRACT

Disclosed is a double-liner electric cooker, comprising a cooker body, liners and cooker covers, wherein two liners and two cooker covers are provided, the cooker body is provided with a first inner cavity, two first inner cavities are mutually separated via a thermal insulation plate, and the two first inner cavities are both provided with cavity openings for the liners to be placed therein; the rear ends of the two cooker covers are respectively hinged to the edges of the cavity openings via hinge shafts, and the axial directions of the two hinge shafts intersect. The electric cooker is convenient to open, and on the basis that the sealing members are convenient to assemble and disassemble, the cooker cover can still maintain good sealing effects.

5 Claims, 8 Drawing Sheets

(58) Field of Classification Search
CPC ...... A47J 27/0806; A47J 27/086; A47J 27/09;
A47J 27/18; A47J 31/3628; A47J 31/407;
A47J 37/1223; A47J 27/092; A47J
27/0802; A47J 27/0815; A47J 27/002;
A47J 27/04; A47J 36/24
USPC ..... 99/289 R, 413, 295, 331, 342, 408, 416,
99/426, 468, 337, 325, 341, 403, 412,
99/447, 448; 219/420, 432, 438, 442,
219/521
See application file for complete search history.

(56) References Cited

U.S. PATENT DOCUMENTS

2014/0360384 A1* 12/2014 Kim .................... A47J 27/0806
99/403
2015/0013548 A1* 1/2015 Patel .................... A47G 19/14
99/323

FOREIGN PATENT DOCUMENTS

| CN | 204260523 U | 4/2015 |
| CN | 204797564 U | 11/2015 |
| CN | 104814667 B | 5/2017 |

* cited by examiner

DOUBLE-LINER ELECTRIC COOKER

RELATED APPLICATIONS

This application is a United States National Stage Application filed under 35 U.S.C 371 of PCT Patent Application Serial No. PCT/CN2015/078145, filed Apr. 30, 2015, the disclosure of all of which are hereby incorporated by reference in their entirety.

TECHNICAL FIELD

The present invention relates to electric cookers, in particular to a novel double-liner electric cooker.

BACKGROUND

Electric cooker is a kind of modern cooking utensils that can process food in various ways such as steaming, boiling, stewing, baking, braising and so on. In general, the electric cooker comprises a cooker body, a liner and a cooker cover, the cooker body is provided with a first inner cavity for receiving the liner, and the cooker cover seals against an opening of the first inner cavity.

Currently, one electric cooker is generally provided with only one liner. In some cases, one electric cooker may be provided with two liners in order to prevent smell pollution when cooking different kinds of food. However, the cooker body includes only one first inner cavity, meaning that one liner can be used at a time. When there is a large amount of food to be cooked, multiple electric cookers are required and may occupy a large space in the kitchen. Moreover, these cookers must be separately operated, which is inconvenient.

The cooker cover usually seals the liner in conjunction with a sealing member, such that the food contained in the liner is effectively heated in the sealed state. Unfortunately, the sealing member for the electric cooker in the prior art is difficult to install and clean.

Moreover, the cover for the electric cooker in the prior art is susceptible to deformation due to the impact of heat and steam. As a result, the inside and outside corners of the cooker cover may upwarp, reducing sealing effects of the first inner cavity.

SUMMARY

It is an object of the present invention to overcome the foresaid shortcomings of the prior art by providing a novel double-liner electric cooker. The electric cooker is convenient to open, and on the basis that the sealing members are convenient to assemble and disassemble, the cooker cover can still maintain good sealing effects.

The object of the present invention is achieved by the technical solution described below.

A double-liner electric cooker, comprising a cooker body, liners and cooker covers, wherein two liners and two cooker covers are provided, the cooker body is provided with two first inner cavities that fit to the liners in shape and dimensions, the two first inner cavities are mutually separated via a thermal insulation plate, and the two first inner cavities are both provided with cavity openings for the liners to be placed therein; the rear ends of the two cooker covers are respectively hinged to the edges of the cavity openings via hinge shafts, and the axial directions of the two hinge shafts intersect; when the two cooker covers rotate to the position where they cover the cavity openings via the hinge shafts, the adjacent edges of the two cooker covers are equally spaced from each other by a gap, while when the two cooker covers rotate to the position away from the cavity openings via the hinge shafts, the two cooker covers form a V shape; the bottom of each cooker cover is provided with a second inner cavity for accommodating the top end of the liner, a wall surrounding the second inner cavity is provided with a snapping groove, a sealing member is fixed in the second inner cavity in a detachable manner, and the circumferential edge of the sealing member is provided with a protrusion which transversely protrudes and is snap-fastened with the snapping groove; and the protrusions of the two sealing members corresponding to the two cooker covers are symmetrical relative to the center of the cooker body.

Preferably, the cooker cover comprises an upper cover provided with the second inner cavity at the bottom thereof, and a lower cover formed in a ring shape and fixed to the bottom of the upper cover, the periphery of the lower cover abuts against the inner wall of the second inner cavity; the hinge shafts are pivotally fixed to the rear end of the upper cover, the upper cover comprises an inside corner proximal to the hinge shafts and an outside corner distal to the hinge shafts, wherein the outside corner is provided with a permeable member, a magnetic member magnetically engaging with the permeable member is fixed to the lower cover corresponding to the outside corner, a foot-pad abutting against the inside corner protrudes from the lower cover corresponding to the inside corner.

Preferably, the lower cover is fixed with a lining cover at the center thereof, the liner cover covers an opening of the lower cover.

Preferably, the cooker body is provided with a moveable button opposing the hinge shafts at the top end thereof, the button comprises two pressing portions and two buckling portions extending from bottoms of the two pressing portions respectively, a buckle plate cooperating with each buckling portion protrudes from a front end of corresponding cooker cover; the two hinge shafts are equipped with two torsion springs, respectively, with one end of each torsion spring fixedly connected to the cooker body and the other end fixedly connected to corresponding cooker cover.

Preferably, the inside corners of the upper covers of the two cooker covers are adjacent to each other, the outside corners of the upper covers of the two cooker covers are away from each other, the button is disposed at top center of front side of the cooker body, the buckle plate is disposed on the upper cover, and the upper covers of the two cooker covers are snap-fit connected to the buckling portion of the button by their respective buckle plate.

Preferably, two pressing portions adjacent to each other and independent of each other are provided, the two pressing portions are in form of a bar extending along length direction of the cooker body.

Preferably, the edge of each cooker cover is composed of a U-shaped arc edge and a straight edge, the straight edges of the two cooker covers are adjacent to each other when the two cooker covers rotate to the position where they cover the cavity openings via the hinge shafts.

Preferably, two bosses are provided at two corners of the rear end of the cooker body, respectively, the two hinge shafts are rotatably mounted in the bosses with both ends thereof penetrating through and connected to the rear end of the cooker cover.

Preferably, the sealing member comprises a fixing ring, a sealing cover and a sealing ring for sealing liner opening that are stacked from top to bottom, both the fixing ring and the sealing ring encircle around periphery of the sealing cover, the protrusions protrude from the outer side face of the fixing ring, the sealing cover is shaped and sized to fit to the opening of the liner, the sealing ring is a conical ring; the circumferential edge of the sealing cover is snap-fastened with the lower cover.

Preferably, the bottom of the upper cover is provided with a positioning post that protrudes downwards therefrom, the lower end of the positioning post is provided with a connecting head, and the center of the sealing cover is provided with a connecting sleeve into which the connecting head is inserted.

As compared with the prior art, the present invention has the following advantageous effects.

By means of the hinge shafts that intersect, the two cooker covers do not interfere with each other during opening and closing, so they are easy to open and would not be easily stuck. At the same time, only a small gap is maintained between the two cooker covers when they cover the liners, not only ensuring separation of the two liners without the food cooked therein affecting each other, but also reducing the volume of the cooker body to the largest extent so as to save the kitchen space. In addition, the cooker body is provided with two first inner cavities for receiving the two liners. The two first inner cavities are mutually separated via a thermal insulation plate to allow them to separately heat the food at the same time, the cooking efficiency is therefore increased. Moreover, the cooperation between the protrusions and the snapping groove and the symmetrical arrangement of the two protrusions can prevent incorrect assembling of the two sealing members. The sealing members can be easily and quickly assembled after being cleaned and provide good sealing effects. This not only provides excellent ease of use, but also prevents any potential safety hazard that may be caused by the incorrect assembling.

According to the present invention, the lower cover abutting against the second inner cavity increases the strength of the upper cover, so the cooker cover as a whole is not susceptible to thermal deformation. Moreover, with engagement of the permeable member and the magnetic member, the upper cover can be firmly attached at the outside corner away from the hinge shafts; with the foot-pad abutting against the upper cover, the inside corner is firmly snapped. As a result, the cooker cover formed of the upper and lower covers has a higher rigidity to prevent upwarp and deformation and keep a tight sealing against the first inner cavity.

Figure 1:
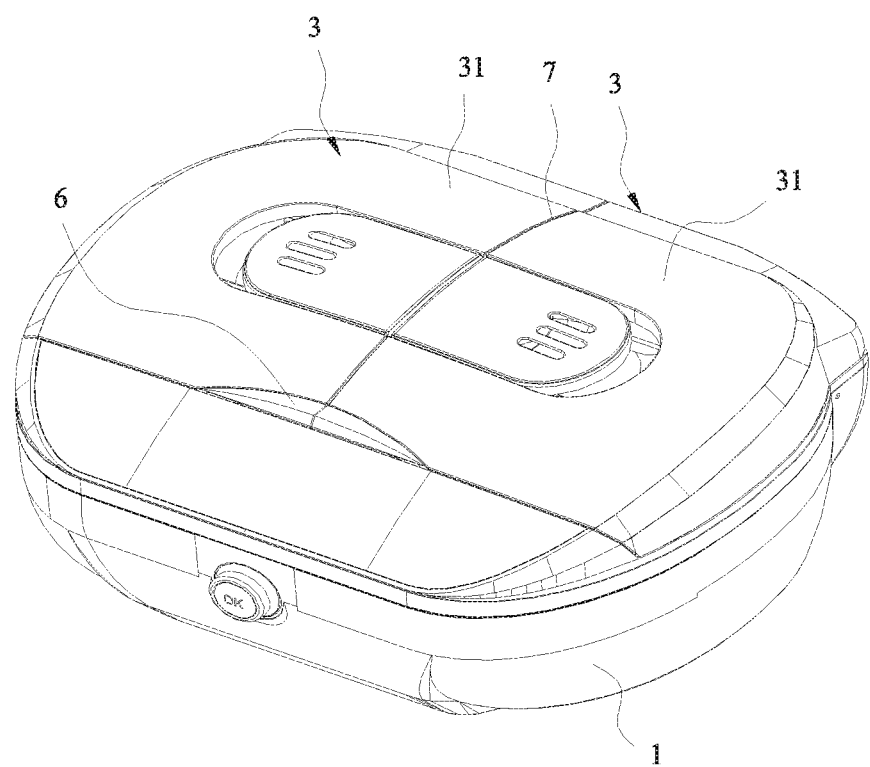
FIG. 1 is a structural representation of the novel double-liner electric cooker according to the present invention.

The reference signs shown in the figures are described as follows: 1—cooker body; 11—first inner cavity; 111—cavity opening; 12—boss; 2—liner; 3—cooker cover; 31—upper cover; 311—second inner cavity; 312—hinge shaft; 313—snapping groove; 314—positioning post; 315—connecting head; 316—inside corner; 317—outside corner; 32—lower cover; 321—magnetic member; 322—foot-pad; 33—buckle plate; 34—U-shaped arc edge; 35—straight edge; 4—sealing member; 401—protrusion; 41—fixing ring; 42—sealing cover; 421—connecting sleeve; 43—sealing ring; 5—lining cover; 6—button; 61—pressing portion; 62—buckling portion; 7—gap; 8—torsion spring; 9—thermal insulation plate.

DETAILED DESCRIPTION OF THE INVENTION

The invention will now be described further below with reference to the accompanying drawings and specific embodiments thereof.

As shown in FIGS. 1-5, a double-liner electric cooker comprises a cooker body 1, liners 2 and cooker covers 3, wherein two liners 2 and two cooker covers 3 are provided, the cooker body 1 is provided with two first inner cavities 11 that fit to the liners 2 in shape and dimensions, the two first inner cavities 11 are mutually separated via a thermal insulation plate 9, and the two first inner cavities 11 are both provided with cavity openings 111 for the liners 2 to be placed therein; the rear ends of the two cooker covers 3 are respectively hinged to the edges of the cavity openings 111 via hinge shafts 7, and the axial directions of the two hinge shafts 7 intersect; when the two cooker covers 3 rotate to the position where they cover the cavity openings 111 via the hinge shafts 7, the adjacent edges of the two cooker covers 3 are equally spaced from each other by a gap 7, while when the two cooker covers 3 rotate to the position away from the cavity openings 111 via the hinge shafts 7, the two cooker covers 3 form a V shape; the bottom of each cooker cover 3 is provided with a second inner cavity 311 for accommodating the top end of the liner 2, a wall surrounding the second inner cavity 318 is provided with a snapping groove 313, a sealing member 4 is fixed in the second inner cavity 311 in a detachable manner, and the circumferential edge of the sealing member 4 is provided with a protrusion 401 which transversely protrudes and is snap-fastened with the snapping groove 313; and the protrusions 401 of the two sealing members 4 corresponding to the two cooker covers 3 are symmetrical relative to the center of the cooker body 1.

By means of the hinge shafts 7 that intersect, the two cooker covers 3 do not interfere with each other during opening and closing, so they are easy to open and would not be easily stuck. At the same time, only a small gap 7 is maintained between the two cooker covers when they cover the liners, not only ensuring separation of the two liners 2 without the food cooked therein affecting each other, but also reducing the volume of the cooker body 1 to the largest extent so as to save the kitchen space. In addition, the cooker body 1 is provided with two first inner cavities 11 for receiving the two liners 2. The two first inner cavities 11 are mutually separated via a thermal insulation plate 9 to allow them to separately heat the food at the same time, the cooking efficiency is therefore increased. Moreover, the cooperation between the protrusions 401 and the snapping groove 313 and the symmetrical arrangement of the two protrusions 401 can prevent incorrect assembling of the two sealing members 4. The sealing members 4 can be easily and quickly assembled after being cleaned and provide good sealing effects. This not only provides excellent ease of use, but also prevents any potential safety hazard that may be caused by the incorrect assembling.

Of course, in order to better distinguish the two liners 2 and prevent misuse, the liners 2 may be arranged such that they are symmetrical relative to the center of the cooker body 1 and have a non-equilateral polygon or non-circular shape.

Figure 5:
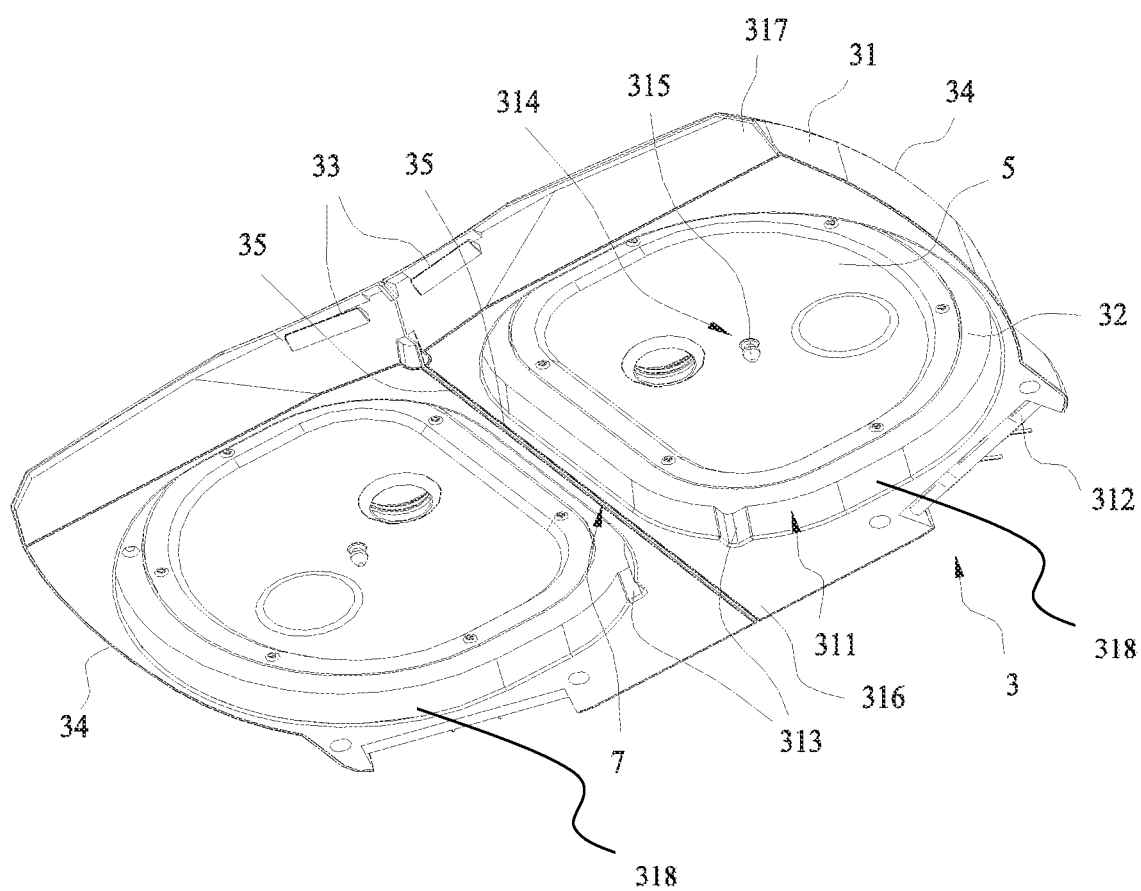
FIG. 5 is a structural representation of the cooker covers according to the present invention when viewed from bottom.
Figure 6:
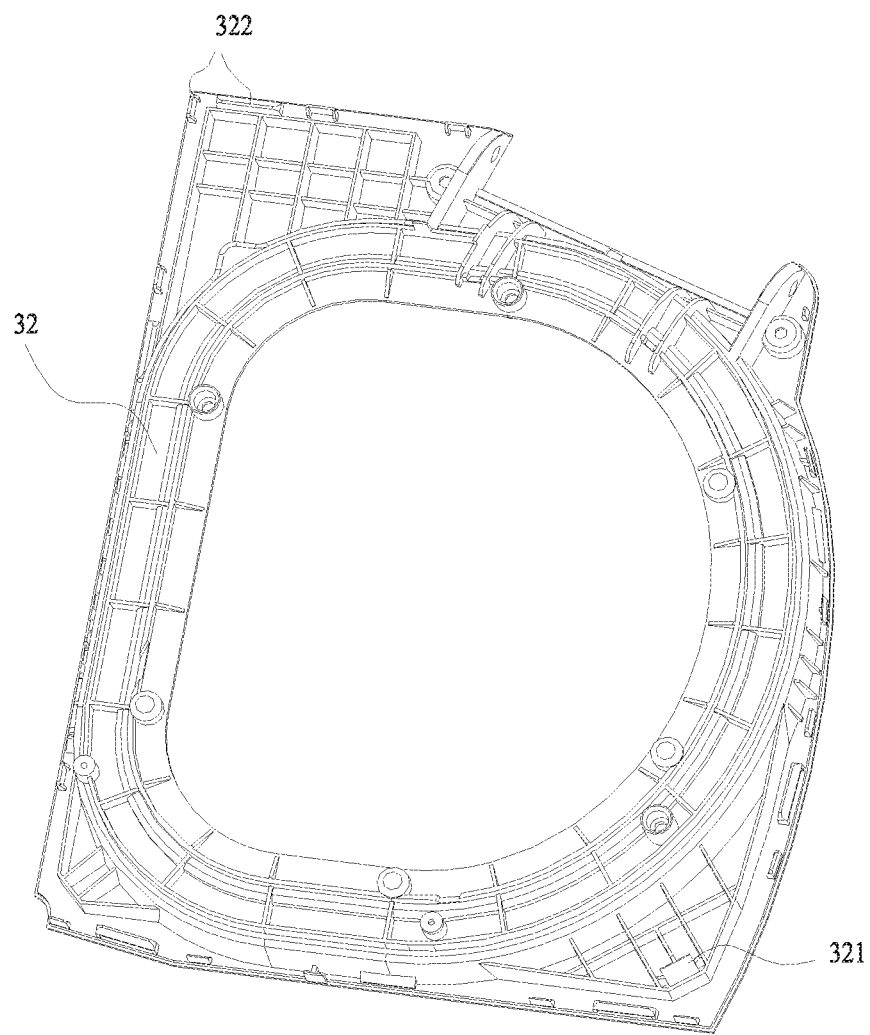
FIG. 6 is a structural representation of the lower cover according to the present invention.

According to another preferred embodiment as shown in FIGS. 5-6, in order to facilitate assembling and disassembling and cleaning, and prevent upwarp of the cooker cover 3 due to thermal deformation, the cooker cover 3 comprises an upper cover 31 provided with a second inner cavity 311 at the bottom thereof and a lower cover 32 formed in a ring shape and fixed to the bottom of the upper cover 31, the periphery of the lower cover 32 abuts against the inner wall of the second inner cavity 311; the hinge shafts 7 are pivotally fixed to the rear end of the upper cover 31, the upper cover 31 comprises an inside corner 316 proximal to the hinge shafts 312 and an outside corner 317 distal to the hinge shafts 312, wherein the outside corner 317 is provided with a permeable member 319, a magnetic member 321 magnetically engaging with the permeable member 319 is fixed to the lower cover 32 corresponding to the outside corner 317, a foot-pad 322 abutting against the inside corner 316 protrudes from the lower cover 32 corresponding to the inside corner 316.

The lower cover 32 abutting against the second inner cavity 311 increases the strength of the upper cover 31, so the cooker cover 3 as a whole is not susceptible to thermal deformation. Moreover, with engagement of the permeable member 319 and the magnetic member 321, the upper cover 31 can be firmly attached at the outside corner 317 away from the hinge shafts 312; with the foot-pad 322 abutting against the upper cover 31, the inside corner 316 is firmly snapped. As a result, the cooker cover 3 formed of the upper cover 31 and lower cover 32 has a higher rigidity to prevent upwarp and deformation and keep a tight sealing against the first inner cavity 11.

Preferably, to further increase the rigidity and prevent upwarp of the cooker cover 3 due to thermal deformation, the lower cover 32 is fixed with a lining cover 5 at the center thereof, the liner cover 5 covers an opening of the lower cover 32, as shown in FIG. 5.

Figure 3:
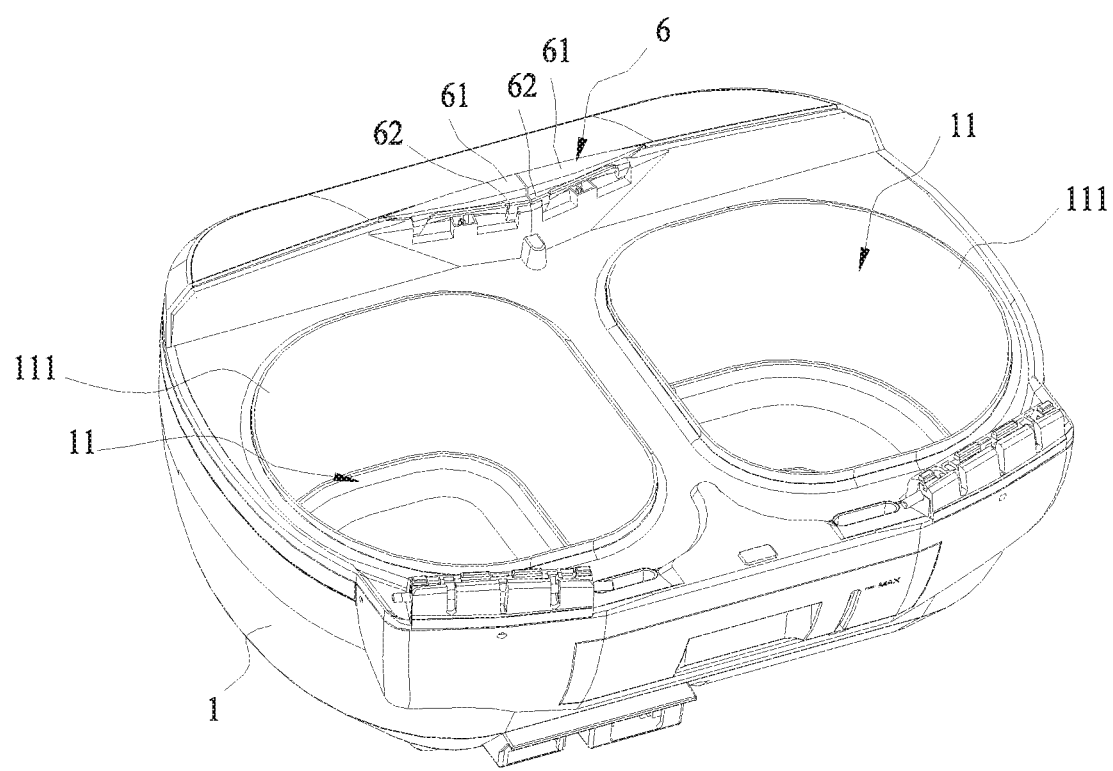
FIG. 3 is a structural representation of the cooker body according to the present invention.
Figure 4:
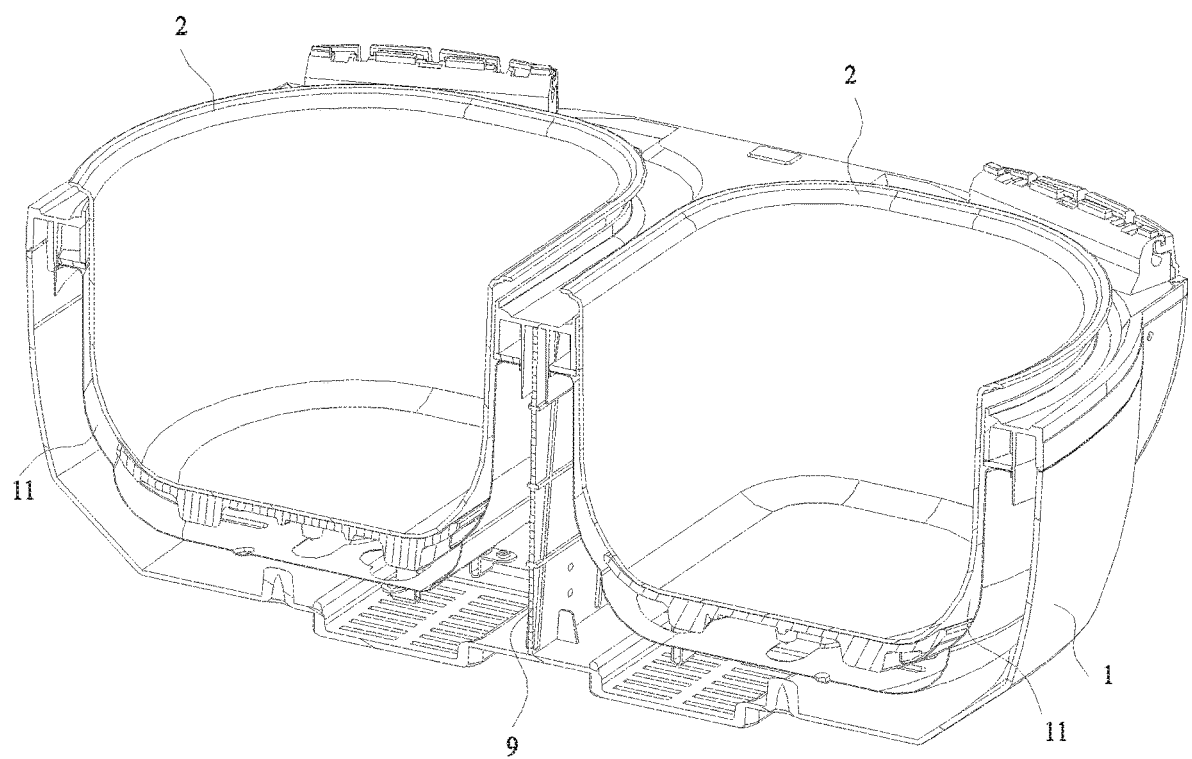
FIG. 4 is a perspective cut-away view of that shown in FIG. 2.

To facilitate opening and closing of the two cooker covers 3, as shown in FIGS. 3 and 5, the cooker body 1 is provided with a moveable button 6 opposing the hinge shafts 7 at the top end thereof, the button 6 comprises two pressing portions 61 and two buckling portions 62 extending from bottoms of the two pressing portions 61 respectively, a buckle plate 33 cooperating with each buckling portion 62 protrudes from a front end of corresponding cooker cover 3; the two hinge shafts 7 are equipped with two torsion springs 8, respectively, with one end of each torsion spring 8 fixedly connected to the cooker body 1 and the other end fixedly connected to corresponding cooker cover 3. After the pressing portion 61 is pressed, the buckling portion 62 disengages from the buckle plate 33 and the cooker cover 3 is automatically opened under the action of the torsion spring 8, facilitating the opening and closing process.

According to a preferred embodiment of the electric cooker of the present invention as shown in FIG. 5, the inside corners 316 of the upper covers 31 of the two cooker covers 3 are adjacent to each other, the outside corners 317 of the upper covers 31 of the two cooker covers 3 are away from each other, the button 6 is disposed at top center of front side of the cooker body 1, so as to be convenient for pressing. The buckle plate 33 is disposed on the upper cover 31, and the upper covers 31 of the two cooker covers 3 are snap-fit connected to the buckling portion 62 of the button 6 by their respective buckle plate 33.

To separately control opening and closing of the two cooker covers 3, two pressing portions 61 adjacent to each other and independent of each other are provided, the two pressing portions 61 are in form of a bar extending along length direction of the cooker body 1, as shown in FIG. 3. The two bar-shaped pressing portions 61 adjacent to each other provide an operation area that is concentrated to the maximum extent for easy press operation, and the bar shape also favors the touch and press.

To better place the two cooker covers 3 onto the cavity openings 111 in order to prevent interference between the two cooker covers 3, the edge of each of the cooker covers 3 is composed of a U-shaped edge 34 and a straight edge 35, the straight edges 35 of the two cooker covers 3 are adjacent to each other when the two cooker covers 3 rotate to the position where they cover the cavity openings 111 via the hinge shafts, as shown in FIG. 5, so that it is benefit to form an equally spaced gap 7.

Figure 2:
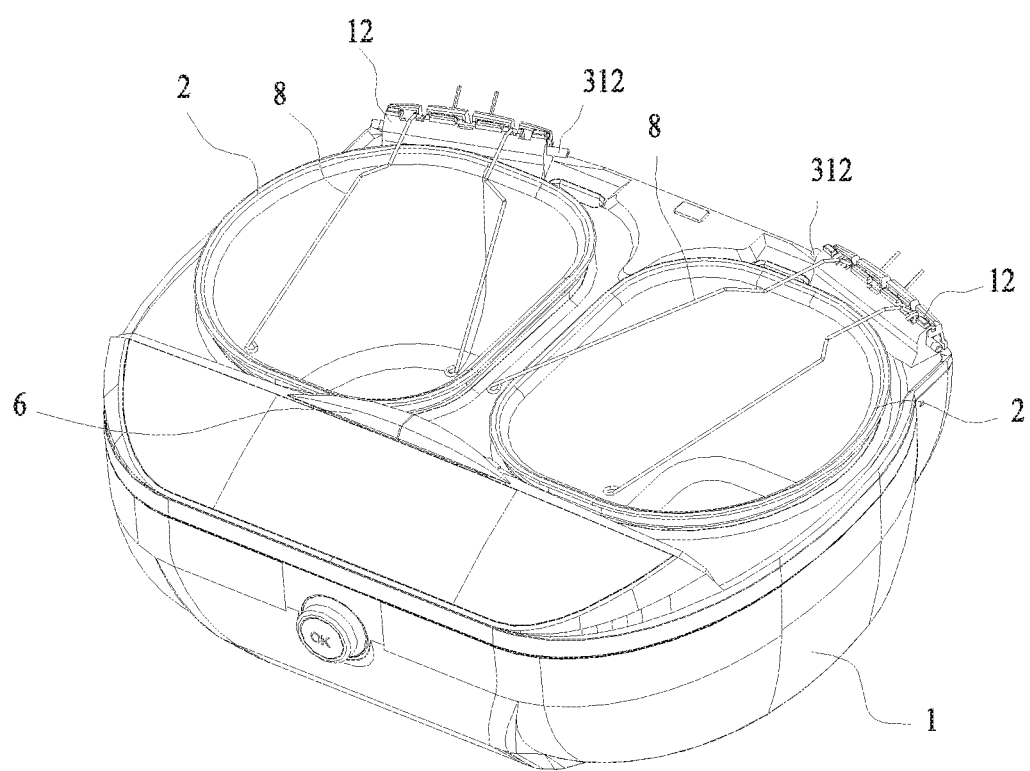
FIG. 2 is a structural representation of that shown in FIG. 1, with the cooker covers removed.

As shown in FIG. 2, in order to provide stable hinge connection for the cooker covers 3, two bosses 12 are provided at two corners of the rear end of the cooker body 1, respectively, the two hinge shafts 7 are rotatably mounted in the bosses 12 with both ends thereof penetrating through and connected to the rear end of the cooker covers 3.

Figure 7:
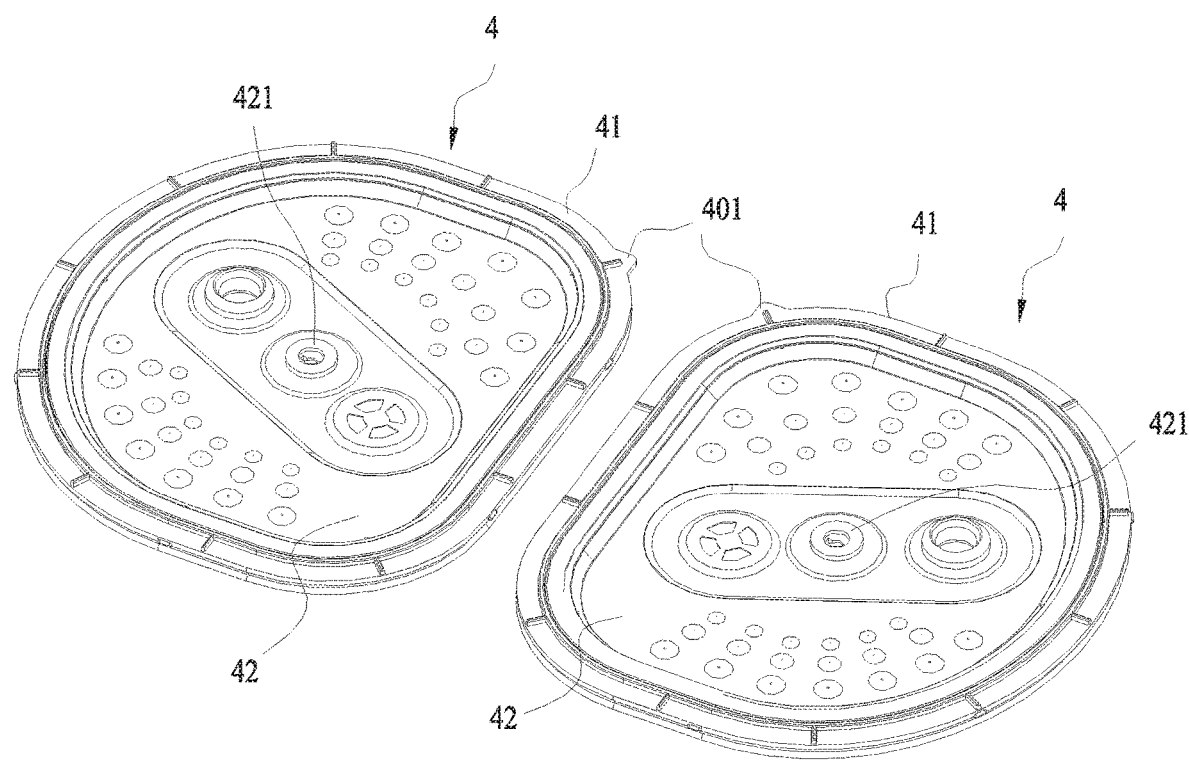
FIG. 7 is a structural representation of the sealing member according to the present invention.
Figure 8:
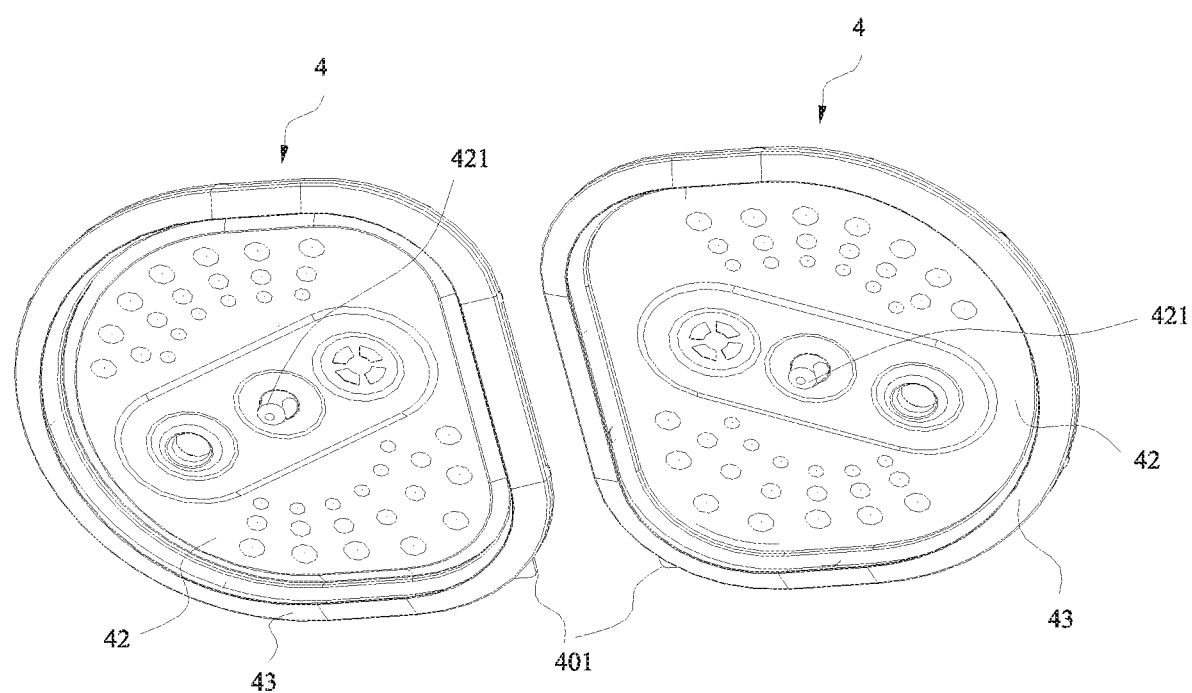
FIG. 8 is another structural representation of the sealing member according to the present invention.

As shown in FIGS. 7-8, the sealing member 4 comprises a fixing ring 41, a sealing cover 42 and a sealing ring 43 for sealing an opening of the liner 2 that are stacked from top to bottom, both the fixing ring 41 and the sealing ring 43 encircle around periphery of the sealing cover 42, the protrusions 401 protrude from the outer side face of the fixing ring 41, the sealing cover 42 is shaped and sized to fit to the opening of the liner 2, the sealing ring 43 is a conical ring; the circumferential edge of the sealing cover 42 is snap-fastened with the lower cover 32. The fixing ring 41 increases the strength of the sealing ring 43 and the sealing cover 42 and facilitates connection to the cooker cover 3. The conical shape of the sealing ring 43 provides a better sealing against the opening of the liner 2.

As shown in FIGS. 5 and 7-8, to facilitate the cleaning, the bottom of the upper cover 31 is provided with a positioning post 314 that protrudes downwards therefrom, the lower end of the positioning post 314 is provided with a connecting head 315, and the center of the sealing cover 42 is provided with a connecting sleeve 421 into which the connecting head 315 is inserted. The insertion of the connecting head 315 into the connecting sleeve 421 facilitates quick positioning and assembling of the sealing member 4 and the cooker covers 3.

It will be apparent to those skilled in the art that various changes and modifications may be made in accordance with the technical solutions and concepts described above, and that all such changes and modifications are within the scope of the appended claims.

What is claimed is:

1. A novel double-liner electric cooker, comprising a cooker body, liners and cooker covers, characterized in that two liners and two cooker covers are provided, the cooker body is provided with two first inner cavities that fit to the liners in shape and dimensions, the two first inner cavities are mutually separated via a thermal insulation plate, and the two first inner cavities are both provided with cavity openings for the liners to be placed therein; rear ends of the two cooker covers are respectively hinged to the cooker body via two hinge shafts, and extended lines along axial directions of the two hinge shafts intersect; when the two cooker covers rotate to a position where they cover the cavity openings via the hinge shafts, adjacent edges of the two cooker covers are equally spaced from each other by a gap, while when the two cooker covers rotate to a position away from the cavity openings via the hinge shafts, the two cooker covers form a V shape; a bottom of each cooker cover is provided with a second inner cavity for accommodating a top end of the liner, wall surrounding the second inner cavity is provided with a snapping groove, a sealing member is fixed in each second inner cavity in a detachable manner, and a circumferential edge of the sealing member is provided with a protrusion which transversely protrudes and is snap-fastened with the snapping groove; and the protrusion of the sealing member corresponding to each cooker cover is symmetrical relative to a center of the cooker body; two bosses are provided at an rear end of the cooker body, respectively, the two hinge shafts are rotatably mounted in the bosses with both ends thereof penetrating through and connected to the rear ends of the cooker covers; the cooker cover comprises an upper cover provided with the second inner cavity at the bottom thereof, and a lower cover formed in a rinq shape and fixed to the bottom of the upper cover, the periphery of the lower cover abuts against the inner wall of the second inner cavity; the hinge shafts are pivotally fixed to the rear end of the upper cover, the upper cover comprises an inside corner proximal to the hinge shafts and an outside corner distal to the hinge shafts, wherein the outside corner is provided with a permeable member, a magnetic member magnetically engaging with the permeable member is fixed to the lower cover corresponding to the outside corner, a foot-pad abutting against the inside corner protrudes from the lower cover corresponding to the inside corner; the lower cover is fixed with a lining cover at the center thereof, the lining cover covering an opening of the lower cover, the cooker body is provided with a moveable button opposing the hinge shafts at the top end thereof, the button comprises two pressing portions and two buckling portions extending from the bottoms of the two pressing portions respectively, a buckle plate cooperating with each buckling portion protrudes from a front end of corresponding cooker cover: the two hinge shafts are equipped with two torsion springs, respectively, with one end of each torsion spring fixedly connected to the cooker body and the other end fixedly connected to corresponding cooker cover.

2. The novel double-liner electric cooker according to claim 1, characterized in that two pressing portions are adjacent to each other and independent from each other, each of the two pressing portions is in a form of a bar extending along a length direction of the cooker body.

3. The novel double-liner electric cooker according to claim 2, characterized in that each cooker cover includes a U-shaped edge and a straight edge, the straight edges of the two cooker covers are adjacent to each other when the two cooker covers rotate to the position where they cover the cavity openings via the hinge shafts.

4. The novel double-liner electric cooker according to claim 1, characterized in that the sealing member comprises a fixing ring, a sealing cover and a sealing ring for sealing liner opening that are stacked from top to bottom, both the fixing ring and the sealing ring encircle around periphery of the sealing cover, the protrusions protrude from the outer side face of the fixing ring, the sealing cover is shaped and sized to fit to the opening of the liner, the sealing ring is a conical ring; the circumferential edge of the sealing cover is snap-fastened with the lower cover.

5. The novel double-liner electric cooker according to claim 4, characterized in that the bottom of the upper cover is provided with a positioning post that protrudes downwards therefrom, the lower end of the positioning post is provided with a connecting head, and the center of the sealing cover is provided with a connecting sleeve into which the connecting head is inserted.

* * * * *